United States Patent [19]

Molteni et al.

[11] 3,868,380

[45] Feb. 25, 1975

[54] DIPHENYLYL-ALKANOYLAMINOPYRIDINES AND SALTS THEREOF

[76] Inventors: Luigi Molteni, Corso di Porta Romana Nr. 69; Franco Tenconi, Via Palestrina Nr. 20, Monza; Renato Tagliabue, Via V. Veneto 4, Bovisio, all of Milan, Italy

[22] Filed: May 22, 1973

[21] Appl. No.: 362,759

[30] Foreign Application Priority Data
May 23, 1972 Italy.................................. 24732/72

[52] U.S. Cl. .... 260/295 AM, 260/295.5 A, 424/266
[51] Int. Cl............................................. C07d 31/44
[58] Field of Search .............. 260/295 AM, 295.5 A

[56] References Cited
OTHER PUBLICATIONS

Roberts et al., Basic Principles of Organic Chemistry, Benjamin Publishers Inc., Page 806, (1965)QD 251 R58 C.6.

Jain et al., J. Med. Chem. Vol. 11 (1) pp. 87–92, Jan. 1968, RS 1 J5.

*Primary Examiner*—Alan L. Rotman
*Attorney, Agent, or Firm*—Waters, Roditi, Schwartz & Nissen

[57] ABSTRACT

Pharmaceutically useful compounds are provided of the formula:

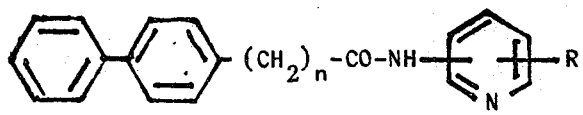

wherein R is hydrogen or a lower alkyl group and n is 1, 2 or 3, and the pharmaceutically acceptable acid addition salts thereof. The compounds of the invention have interesting pharmaceutical properties including use as anti-inflammatories.

6 Claims, No Drawings

DIPHENYLYL-ALKANOYLAMINOPYRIDINES AND SALTS THEREOF

The present invention relates to diphenylyl-alkanoylaminopyridines and more particularly to such compounds exhibiting anti-inflammatory activity of a prolonged duration and to salts of such compounds with physiologically acceptable acids.

The present invention provides a series of diphenylyl-alkanoylaminopyridines of the general formula:

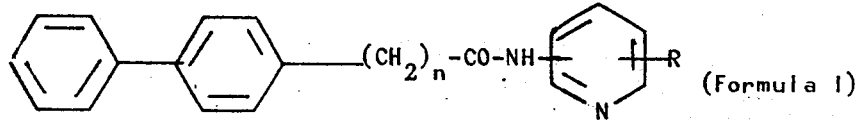

wherein R is hydrogen or a lower alkyl group and $n$ is 1, 2 or 3, and their salts with physiologically acceptable acids. The lower alkyl groups may be for example of from 1 to 6 carbon atoms and the salts of physiologically acceptable acids may be for example hydrochlorides, sulphates, succinates or maleates.

According to the invention also, there are provided pharmaceutical compositions with anti-inflammatory activity, containing a compound of the general formula (I) as the active principle, and, if desired, with any suitable pharmaceutical excipient.

Another object of the invention is a procedure for preparing compounds of the general formula (I). According to such a procedure, a reactive derivative of a diphenylyl-alkanoic acid of the formula:

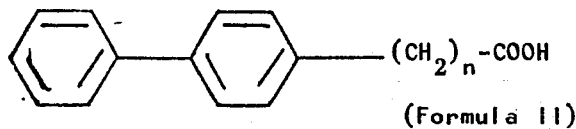

wherein $n$ has the above-mentioned value, is reacted with an aminopyridine of the formula:

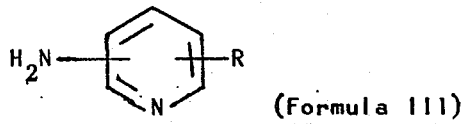

wherein R has the above-mentioned value, and the reaction product is thereafter isolated by known methods.

The reactive derivative of a diphenylyl-alkanoic acid may be acyl halogen compound, or anhydride or a mixed anhydride (for example, with propionic acid). Particularly simple, and therefore preferable, is the use of a diphenylyl-alkanoyl chloride, easily obtainable from the corresponding acid, for example, by treatment with thionyl chloride or phosphorus pentachloride. The preferred method is to react the unrefined acid chloride with the appropriate amine in a solvent such as ethyl ether, benzene, ethyl acetate, acetone, methylethylketone, or the like, which is always used in an anhydrous form, in the presence of hydrochloric acid acceptors such as sodium or potassium carbonate, triethylamine, pyridine or the excess amine itself, at a temperature in the range of from −5° to +30°C. The examples which follow illustrate the method of the invention.

EXAMPLE 1

23 gm (0.1 mole) diphenylacetic acid chloride dissolved in 300 c.c. anhydrous ethyl ether are slowly added dropwise to a solution of 19 gm (0.2 mole) 2-aminopyridine in 300 c.c. anhydrous ethyl ether.

The reaction mixture is agitated and the temperature is kept at between 5° and 10°C with an ice bath.

After the addition has been completed, the agitation of the mixture is continued and the temperature is allowed to rise to 20°–25°C.

After leaving to stand for a few hours, the gummy precipitate solidifies and becomes filterable. After separating off the precipitate, the ether is evaporated under reduced pressure to a volume of about 100 c.c.

The ether is left to stand at a low temperature below 10°C when the remaining portion of the product precipitates and is filtered off and added to the first precipitate. The product thus obtained is thoroughly washed, first in water and then in a solution of sodium bicarbonate, and then again in water. After drying in air, the product is crystallized from anhydrous ethanol or from acetone and water. The analytical data corresponds to calculated values.

Yield: 18 gm. Melting point 122°–124°C.

Certain salts of the product had the following melting points:

| | |
|---|---|
| Hydrochloride: | m.p. 200/200°C |
| Sulphate: | m.p. 177/179°C |
| Succinate: | m.p. 128/129°C |
| Maleate: | m.p. 149/151°C |

EXAMPLE 2

23 gm (0.1 mole) diphenylacetic acid chloride dissolved in 150 c.c. anhydrous acetone are slowly added dropwise, with agitation, to 200 c.c. anhydrous acetone solution containing 9.4 gm (0.1 mole) 3-aminopyridine and 7.9 gm (0.1 mole) anhydrous pyridine The temperature is maintained at 0°C with a water and ice bath. After the temperature has been allowed to rise to 20°–25°C, the reaction mixture is poured into 500 c.c. cold water, with agitation. The precipitate is filtered, washed with water, and, after drying in air, crystallized from acetone and water. The analytical data corresponds to calculated values.

Yield: 16 gm. Melting point 168°–169°C.

EXAMPLE 3

23 gm (0.1 mole) diphenylacetic acid chloride dissolved in 150 c.c. anhydrous acetone are slowly added dropwise to a solution of 10.8 gm (0.1 mole) 2-amino-6-methylpyridine in 300 c.c. anhydrous acetone, in which 14 gm anhydrous potassium carbonate has been suspended.

The reaction mixture is efficiently agitated at a temperature of around 10°C.

After the addition has been completed, agitation of the suspension is continued for 2 hours at 10°C.

Finallly, the mixture is filtered through a folded filter and the residual salt is carefully washed with acetone on the filter.

The solvent is evaporated at low temperature and reduced pressure, the residue is collected with a small amount of ether and the precipitate is filtered.

After washing with water and drying in air, the product is crystallized from ethanol and water, or from acetone and water. Analysis is in agreement with theoretical data.

Yield: 17 gm. Melting point 119°–120°C.

With processes similar to those described above, we have obtained other compounds of the general formula (I), as reported in Tables 1 and 2. The compounds obtained in accordance with this invention have proved very interesting from the pharmacological and therapeutic points of view, since they possess anti-inflammatory activity of a high level and long duration.

The acute toxicities of the compounds suspended in carboxymethylcellulose at 1 percent have been determined by oral administration to rats.

The $LD_{50}$ has been calculated in accordance with the graphic method of Litchfield and Wilcoxon.

The anti-inflammatory activity of the compounds has been determined in two tests: oedema induced by carrageenin, and erythema induced by UV irradiation.

In the first test, oedema was induced in the right hind leg of the rat by administration of a 1 percent carrageenin solution to the plantar zone. The oedema was evaluated by means of a mercury plethysmometer. The products suspended in carboxymethylcellulose were administered orally in doses varying from 20 to 30 mg/kg (Tables 1 and 2).

In the second test, using guinea pigs, we provoked an erythema on a specific area of the skin by exposure to UV radiation for 60 seconds. The erythema was evaluated by assuming arbitrary values from 0 to 3 and expressing them later in percentages in relation to control values. The products suspended in carboxymethyl cellulose at 1 percent were given orally, the dosage varying from 10 to 20 mg/kg (Table 1).

Table 1

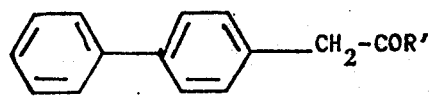

| N° | -R' | M.p. °C | $LD_{50}$ mg/kg | % inhibition carrageenin oedema | % inhibition UV erythema |
|---|---|---|---|---|---|
| 1 | NH—⟨pyridyl-4⟩ | 122/4 | >2000 | 50 | 75 |
| 2 | NH—⟨pyridyl-3⟩ | 168/9 | >2000 | 10 | 15 |
| 3 | NH—⟨pyridyl-2⟩ | 148/9 | >2000 | 25 | 30 |
| 4 | NH—⟨6-methylpyridyl-2⟩ | 119/20 | >2000 | 40 | 55 |
| 5 | NH—⟨5-methylpyridyl-2⟩-CH₃ | 139/40 | >2000 | 20 | 40 |
| 6 | NH—⟨4-methylpyridyl-2⟩ | 151/52 | >2000 | 40 | 60 |
| 7 | NH—⟨3-methylpyridyl-2⟩ | 138/39 | >2000 | 10 | 10 |

Table 2

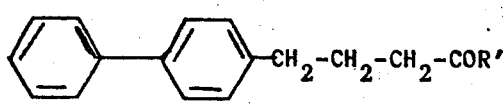

| N° | R' | M.p. | Carrageenin Oedema % inhibition | Dose mg | LD$_{50}$ |
|---|---|---|---|---|---|
| 1 | OH | known | 50 | 20 | <500 |
| 2 | NH-(pyridyl) | 119/20 | 50 | 60 | >1000 |

We claim:
1. A diphenyl yl-alkanoylaminopyridine of the formula:

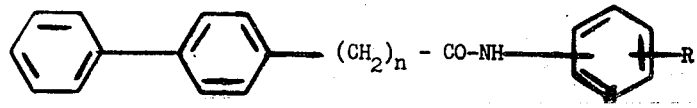

in which R is hydrogen or a linear $C_{1-4}$ alkyl group and $n$ is 1, 2 or 3, and a pharmaceutically acceptable acid addition salt thereof.

2. 2-(diphenyl-acetylamino)-pyridine and a pharmaceutically acceptable acid addition salt thereof.

3. 2-(diphenyl-acetylamino)-6-methyl-pyridine and a pharmaceutically acceptable acid addition salt thereof.

4. 2-(diphenyl-acetylamino)-4-methyl-pyridine and a pharmaceutically acceptable acid addition salt thereof.

5. 4-(diphenyl-acetylamino)-pyridine and a pharmaceutically acceptable acid addition salt thereof.

6. 2-(diphenyl-acetylamino-5-methyl-pyridine and a pharmaceutically acceptable acid addition salt thereof.

* * * * *